United States Patent
Tomczek

(10) Patent No.: US 11,727,774 B2
(45) Date of Patent: Aug. 15, 2023

(54) 3D AUDIO FOR DETECTING OBJECTS IN DANGER ZONES AROUND VR PLAYERS

(71) Applicant: Sony Interactive Entertainment Inc., Tokyo (JP)

(72) Inventor: Matthew Tomczek, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/472,548

(22) Filed: Sep. 10, 2021

(65) Prior Publication Data
US 2023/0080909 A1    Mar. 16, 2023

(51) Int. Cl.
G08B 13/196    (2006.01)
H04R 1/40    (2006.01)
H04R 5/04    (2006.01)

(52) U.S. Cl.
CPC ........... G08B 13/196 (2013.01); H04R 1/406 (2013.01); H04R 5/04 (2013.01)

(58) Field of Classification Search
None
See application file for complete search history.

(56) References Cited

U.S. PATENT DOCUMENTS

| | | | | |
|---|---|---|---|---|
| 10,432,796 | B2 * | 10/2019 | Norris | G06F 3/165 |
| 10,449,445 | B2 * | 10/2019 | Brav | A63F 13/285 |
| 10,585,472 | B2 * | 3/2020 | Tokubo | A63F 13/211 |
| 10,902,263 | B1 * | 1/2021 | Angel | A61H 3/061 |
| 11,190,897 | B2 * | 11/2021 | Norris | H04S 7/304 |
| 2021/0112357 | A1 * | 4/2021 | Lyren | H04S 7/30 |
| 2021/0364281 | A1 * | 11/2021 | Petill | G06T 19/006 |
| 2022/0067090 | A1 * | 3/2022 | Jain | G06F 16/686 |

OTHER PUBLICATIONS

"3D audio effect", Wikipedia, retrieved from https://en.wikipedia.org/wiki/3D_audio_effect.
"Signal separation", Wikipedia, retrieved from https://en.wikipedia.org/wiki/Signal_separation.
"Speech synthesis", Wikipedia, retrieved from https://en.wikipedia.org/wiki/Speech_synthesis.
"International Search Report and Written Opinion", dated Feb. 8, 2023, from the counterpart PCT application PCT/US22/76248.

* cited by examiner

*Primary Examiner* — Paul W Huber
(74) *Attorney, Agent, or Firm* — John L. Rogitz

(57) ABSTRACT

Three-dimensional (3D) audio can be presented during an augmented reality, mixed reality, or virtual reality simulation to notify a user that a real-world object is approaching or has crossed a boundary for an interaction space within which the user is to interact with the simulation. The 3D audio may indicate the current location of the intrusion or boundary while still leaving the user immersed in the simulation.

20 Claims, 4 Drawing Sheets

3D AUDIO FOR DETECTING OBJECTS IN DANGER ZONES AROUND VR PLAYERS

FIELD

The present application relates generally to presentation of 3D audio to indicate an intrusion into a real-world interaction space for a virtual simulation.

BACKGROUND

As recognized herein, a computer system may monitor a user during presentation of a virtual reality (VR) simulation to ensure that the user stays within a designated area to safely interact with the simulation without bumping into other real-world objects. But as further recognized herein, safety concerns may also arise when another living thing such as a small child enters the area unbeknownst to the fully-immersed user.

SUMMARY

The present application further recognizes that explicitly and prominently notifying the user of the intrusion, or that the user is about to exit the designated area, can break the user's immersion in the simulation and even negatively affect the simulation itself. For example, if the user's immersion were broken while playing a VR video game, the user may lose to a video game opponent or suffer other consequences within the simulation.

Accordingly, in one aspect a system includes at least one computer medium that is not a transitory signal and that includes instructions executable by at least one processor to identify an intrusion into an interaction space in the real world. The interaction space is designated for use as part of a virtual reality (VR), augmented reality (AR), and/or mixed reality (MR) presentation. The instructions are also executable to, based on the identification of the intrusion, present three-dimensional (3D) audio indicating a current location of the intrusion within the interaction space.

In various example implementations, the intrusion may be identified using input from a camera, using light detection, and ranging (LIDAR), and/or using input from a microphone array and blind source separation. In some examples, the system may include the microphone array.

Additionally, if desired the 3D audio may include a chime or tone. Additionally, or alternatively, the 3D audio may include a computer-generated voice. So, for example, the intrusion may include a person and the computer-generated voice may model the person's own voice.

In various example embodiments, the instructions may be executable to change a volume level at which the 3D audio is presented as the current location of the intrusion changes within the interaction space. E.g., the instructions may be executable to increase the volume level at which the 3D audio is presented as the intrusion gets closer to a current location of a user disposed within the interaction space, the user being different from the intrusion.

Also in various example embodiments, the instructions may be executable to change a frequency with which one or more chimes or tones of the 3D audio are presented as the current location of the intrusion changes within the interaction space. E.g., the instructions may be executable to increase the frequency with which the one or more chimes or tones of the 3D audio are presented as the intrusion gets closer to a current location of a user disposed within the interaction space. The user may be different from the intrusion.

If desired, the system itself may include the at least one processor.

In another aspect, a method includes identifying an encroachment across a boundary of an interaction space existing in the real world. The interaction space is designated for use as part of a virtual reality (VR), augmented reality (AR), and/or mixed reality (MR) presentation. The method also includes, based on the identifying of the encroachment, presenting three-dimensional (3D) audio indicating a location associated with the encroachment.

Thus, in some examples the method may include identifying the encroachment at least in part by identifying an intrusion into the interaction space, where the intrusion may be different from a user disposed within the interaction space that is observing the presentation. Additionally, or alternatively, the method may include identifying the encroachment at least in part by identifying a user disposed within the interaction space as at least partially crossing the boundary.

Also, if desired the method may include increasing, as the encroachment gets closer to a current location of a user disposed within the interaction space, a volume level and/or frequency at which the 3D audio is presented. The user may be different from the intrusion.

In still another aspect, a system includes at least one computer readable storage medium that is not a transitory signal. The computer readable storage medium includes instructions executable by at least one processor to identify an encroachment across a boundary of an interaction space existing in the real world, where the interaction space is designated for use as part of a virtual presentation. The instructions are also executable to, based on the identification of the encroachment, present three-dimensional (3D) audio that indicates a location associated with the encroachment.

So, for example, the instructions may be executable to identify a first object type associated with the encroachment and, based on identification the first object type, select the 3D audio for presentation. The 3D audio may be associated with the first object type but not a second object type different from the first object type. In these examples, the instructions may then be executable to present the 3D audio based on selection of the 3D audio for presentation.

Still further, in some example implementations the 3D audio may be first 3D audio, and the instructions are executable to present the first 3D audio based on identifying the encroachment as having a first size. In these example implementations, the instructions may also be executable to present second 3D audio based on identifying the encroachment as having a second size. The second size may be larger than the first size, and the second 3D audio may be different from the first 3D audio.

The details of the present application, both as to its structure and operation, can be best understood in reference to the accompanying drawings, in which like reference numerals refer to like parts, and in which:

DETAILED DESCRIPTION

Figure 1:
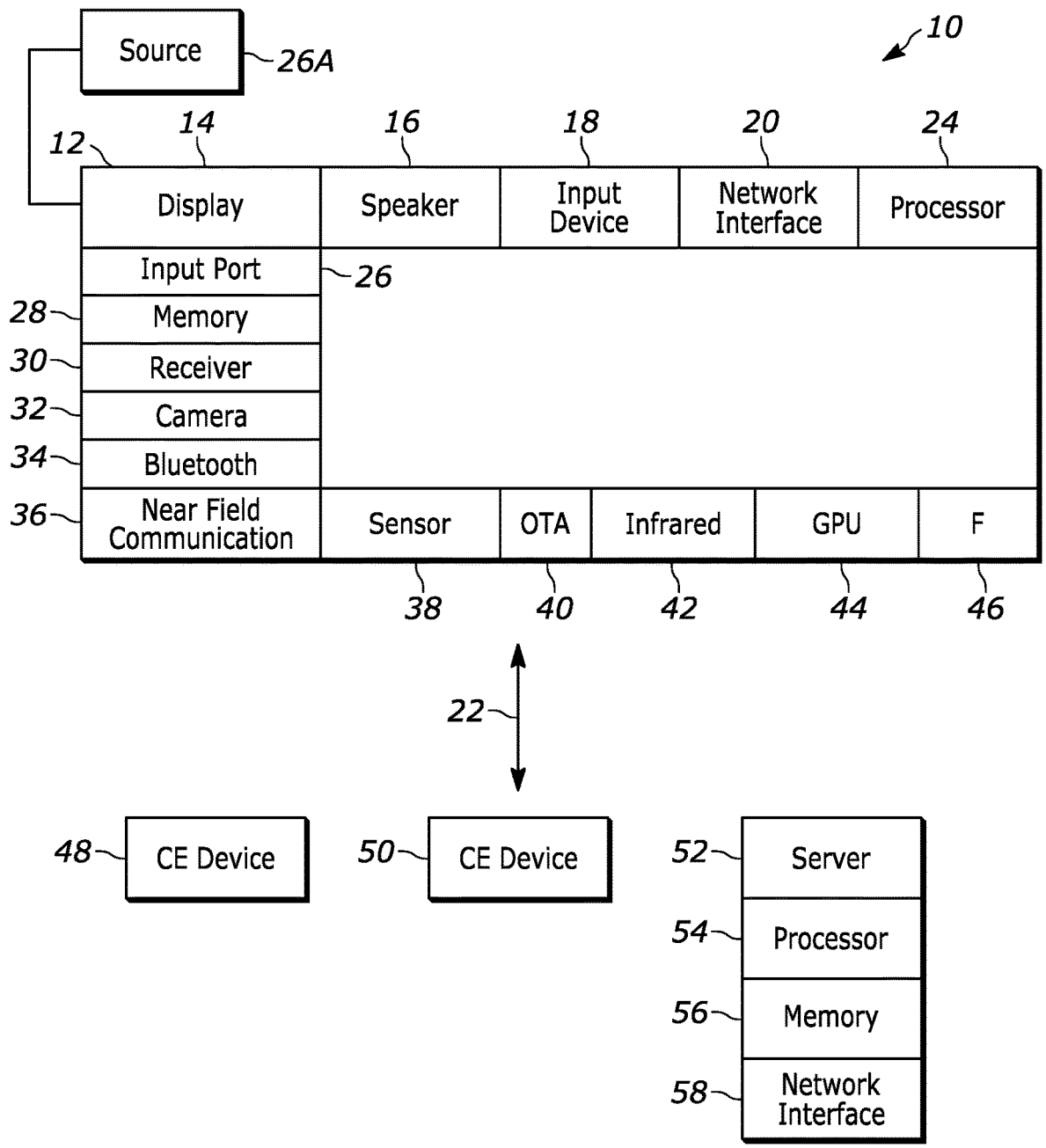
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12 (or even an microphone array for performing blind source separation as described further below). The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage mediums 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command)) that provide input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The user interfaces (UI) described herein may be consolidated and/or expanded, and UI elements may be mixed and matched between UIs.

Figure 2:
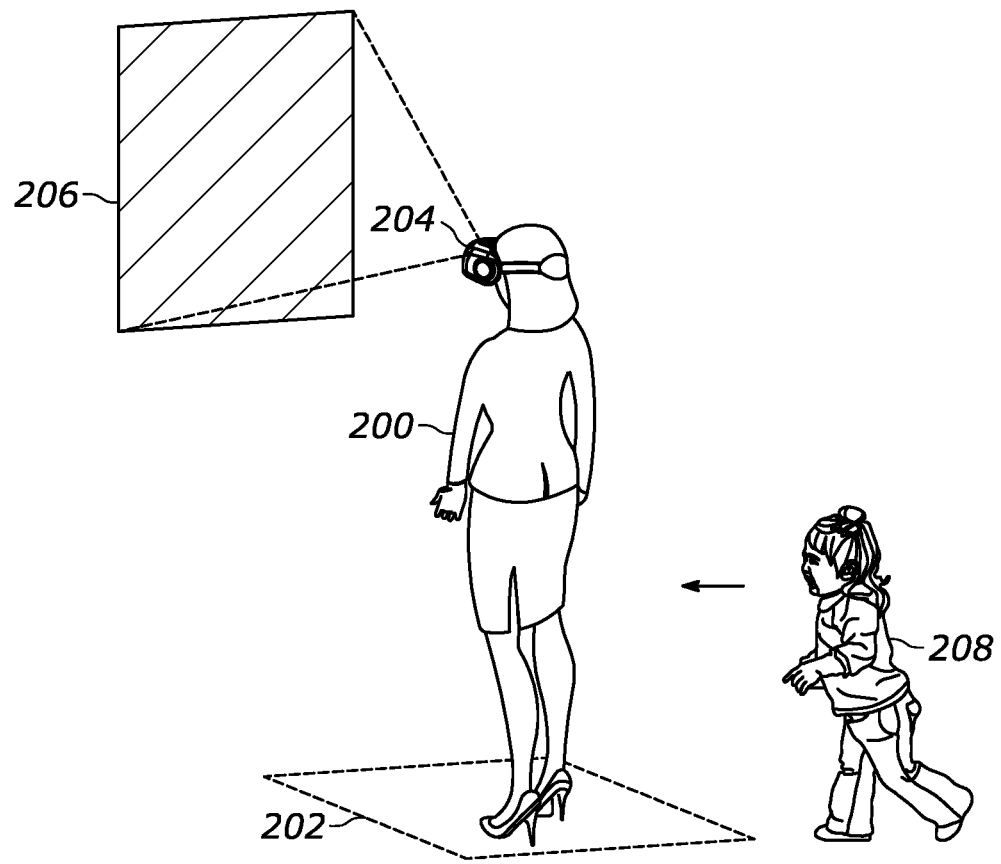
FIG. 2 illustrates a user standing within an interaction area while interacting with a virtual simulation consistent with present principles.

Before describing FIG. 2, it is to be understood consistent with present principles that 3D audio as described herein may be produced via spatial domain convolution of sound waves using head-related transfer functions (HRTFs) and other sound processing algorithms. Thus, 3D audio may be produced through the transformation of sound waves (e.g., using head-related transfer functions, reverberation, HRTF filters and/or cross talk cancellation techniques) to mimic audio as emanating from a particular point in 3D real-world space so that the 3D audio appears to a listener to originate from that point in 3D space.

With the foregoing in mind, reference is now made to FIG. 2. Suppose an end-user 200 is standing within a real-world interaction area/space 202 in his/her personal residence. The interaction area 202 may have been previously defined by the user during a setup process for a virtual simulation, such as a VR video game that is being viewed/played by the user 200 using a VR headset 204. As shown, the area 202 may have various boundaries to establish a box on the floor of the residence. Further note that the area 202 may have additional boundaries to establish a three-dimensional volume for the area 202 that is defined in part by a height dimension at least matching the user's height. Thus, the area 202 may have boundaries in all three dimensions. The user 200 may remain within the box while immersed in the virtual simulation to be able to interact with the simulation safely without striking other real-world objects the user 200 would not be able to see while immersed with the virtual content.

As also shown in FIG. 2, a virtual field of view (FOV) 206 indicates the user's field of view within the simulation as the simulation is presented on the display of the headset 204.

Now suppose the user 200 comes within a threshold distance to one of the boundaries of the area 202 from inside the area 202, that the user 200 has at least part of their body encroach one of the boundaries from inside the area 202 to outside the area 202, and/or that another object such as a dog or a child 208 intrudes by encroaching at least partially into the area 202 through one of the boundaries. To draw the user's attention to the intrusion (and/or to the boundary encroachment into or out of the area 202) without completely breaking the user's immersion in the simulation, three-dimensional (3D) positional audio may be presented using headphone speakers or other suitable stereo speakers already being used to present other audio for the virtual simulation itself.

Thus, in using the 3D audio, the virtual presentation need not be stopped or paused for the user to appreciate the intrusion, which would otherwise completely break the user's immersion. Overt immersion-breaking visual warning messages need not be immediately presented either. Instead, the user may remain as immersed as possible in the virtual world represented by the simulation and still hear the 3D audio to be put on notice of the potential intrusion or encroachment as well as its real-world location relative to the user.

As for the 3D audio itself, in various example implementations it may include a particular chime, tone, or computer-generated voice. In certain instances, the chime, tone, or voice may not be from the virtual simulation itself so that the user may appreciate that the 3D audio pertains to a real-world situation for which the user should pay attention.

For example, a computer-generated voice modeling the voice of an intruding real-life person may be used for the 3D audio to thus inform the user that the real-world person is present at a real-world location indicated by the 3D audio. The person may be identified through facial recognition using input from the headset's camera or another camera. Voice recognition and other techniques may also be used.

Accordingly, even if the intruding person does not actually say anything that might be picked up by a microphone connected to the user's device to then be fed to the user, 3D audio may still be generated in the person's voice using speech synthesis techniques. For example, a voice model that uses voice-mimicking software trained on actual audio samples of the person's voice may be used to produce audio of spoken words in the person's own voice even if the person in reality never spoke the combination of words indicated in the 3D audio itself. To this end, artificial neural networks and deep learning techniques incorporated into speech synthesizing models produced by Google or Lyrebird may be used, as well as other suitable deepfake technologies. Similar models may also be used to produce other 3D audio, such as a dog bark that mimics the user's own dog's particular bark tone, pitch, and duration (again based on previously-provided bark samples, for example).

However, also note that in other examples and to further maintain user immersion, the 3D audio may instead be presented in the voice of a virtual character or avatar from the virtual simulation itself. But here too, note that the 3D audio may still direct the user's attention to the real world to notify the user of an intrusion located at a real-world position indicated by the 3D audio. For example, if the virtual simulation is a VR video game, the voice of a character from the VR video game may be used to say, in 3D audio to appear as coming from behind the user, "your son is behind you" to explicitly indicate to the user that the user's son is located behind the user in the real world.

Figure 3:
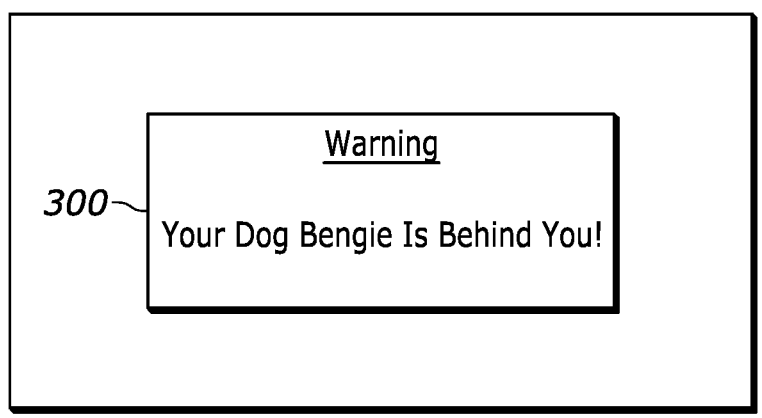
FIG. 3 shows an example text notification that may be presented on a display consistent with present principles.

But regardless of which particular 3D audio type is selected for presentation, note consistent with present principles that in some examples if the intrusion does not exit the area 202 (or the encroachment otherwise does not end) after a threshold non-zero time, a more overt visual notification 300 may be presented on the headset's display as shown in FIG. 3.

Additionally, or alternatively, responsive to determining that a risk of collision is increasing between the user and intrusion, the headset may present the notification 300 of FIG. 3. For example, an artificial neural network trained using video samples of intrusions and encroachments into similarly-sized areas may be used to infer that the risk of a collision between the user and intrusion (or an encroachment by the user over an area boundary) is increasing. This in turn may trigger presentation of the notification 300 of FIG. 3, e.g., once a preconfigured risk threshold has been reached.

Accordingly, it is to be more generally understood that present principles may employ machine learning models, including deep learning models, for training the neural network(s) of an AI model for purposes described herein. Machine learning may use various algorithms trained in ways that include supervised learning, unsupervised learning, semi-supervised learning, reinforcement learning, feature learning, self learning, and other forms of learning. Examples of neural networks that may be used, which can be implemented by computer circuitry, include a recurrent neural network (RNN) which may be appropriate to learn information from a series of images (e.g., showing an intrusion's trajectory), and a type of RNN known as a long short-term memory (LSTM) network. As understood herein, performing machine learning may involve accessing and then training a model on training data to enable the model to process further data to make predictions/inferences. A neural network itself may thus include an input layer, an output layer, and multiple hidden layers in between that that are trained and weighted to make inferences about an appropriate output.

Now describing the notification 300 itself in more detail, note that it may be overlaid on the visual component of the virtual simulation. Or the visual component may be removed altogether and the notification 300 may be presented by itself on the headset's display.

Also note that in the present example, the notification 300 indicates that the user's dog Bengie has been identified as being located behind the user (and within the area 202). Here note that object recognition may have been used to identify the dog as entering the area 202 and, in some examples, if the system already has access to other images of Bengie specifically (e.g., as provided by the user) then the system may determine that the identified dog is Bengie specifically. This in turn may be used to present the name "Bengie" as part of the notification 300.

Further note that in examples where an intrusion is not detected as entering the interaction space but instead the user intentionally or unintentionally exits the space or partially exits the space (e.g., while playing a VR video game establishing the simulation), the notification 300 may be different than as shown in FIG. 3. For example, the notification might instead indicate that a boundary has been crossed or that the user is within a threshold non-zero distance of the boundary itself. The notification might also indicate which particular boundary is the subject of the notification and its location relative to the user.

Figure 4:
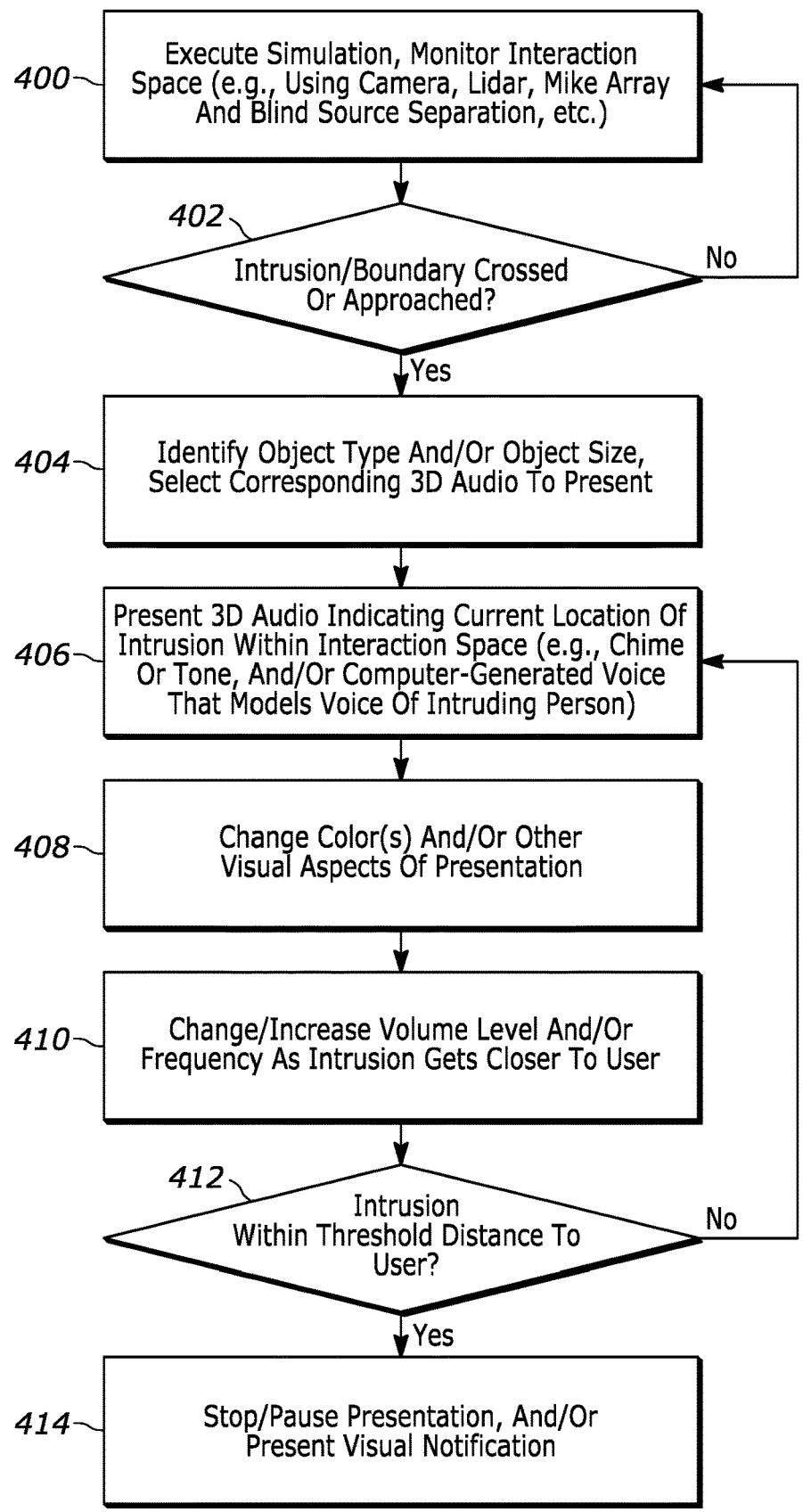
FIG. 4 illustrates example logic in example flow chart format consistent with present principles.

Reference is now made to FIG. 4, which shows a flow chart illustrating example logic that may be executed by a headset and/or connected device such as a server and/or computer game console consistent with present principles. Beginning at block 400, the device may execute and present a virtual simulation/presentation such as a virtual reality (VR) presentation, augmented reality (AR) presentation, and/or mixed reality (MR) presentation.

Also at block 400, the device may monitor the user's interaction space (e.g., the area 202) and location of the user himself or herself. The monitoring may be performed using images from one or more cameras on the headset or elsewhere in the user's environment along with image processing techniques such as computer vision, image registration, spatial mapping, object recognition, facial recognition, etc. Additionally, or alternatively, the space may be monitored for intrusions via light detection and ranging (LIDAR) using a LIDAR device, and/or using input from a microphone array and blind source separation. The microphone array may be located on the headset or may be located elsewhere, such as on a connected video game controller the user might be using to play a VR video game that establishes the virtual presentation.

Furthermore, in some examples different microphone arrays on different connected devices may be used together along with blind source separation to triangulate the location of the intrusion with enhanced accuracy. The locations of the connected devices themselves may be known and/or monitored via GPS, video from a camera and computer vision, or other location determination techniques. The known locations of those devices may in turn be used to deduce the location of the intrusion itself based on blind source separation and triangulation of the intrusion. Note that the connected devices may or may not be inside of the interaction space itself.

From block 400 the logic may then proceed to decision diamond 402 where the device may determine whether an intrusion has been detected as coming within the interaction space, and/or whether a boundary has been encroached inward by another object or outward by the user himself/herself. In some examples, the decision at diamond 402 may also involve determining whether the user has not actually crossed a boundary yet but is within a threshold distance of doing so as described herein.

A negative determination at diamond 402 may cause the logic to revert back to block 400 and proceed again therefrom. However, an affirmative determination at diamond 402 may instead cause the logic to proceed to block 404. At block 404 the device may identify an object type associated with the encroaching object and/or identify a size of the encroaching object since, in some examples, object type and object size may be used to select different respective 3D audio to present at block 404. To this end, a relational database associating various 3D audio with various associated object types and/or sizes may be accessed to select the appropriate 3D audio to use.

For example, where the encroachment is an intruding person or other object coming into the interaction space, the type of encroachment may be identified (e.g., person, dog, inanimate object like a soccer ball, etc.) using camera images in combination with object recognition and/or facial recognition. A first prestored 3D audio sample indicating the current location of the object within the interaction space may then be presented at block 406 based on the recognized object being an object of a first type, and a second prestored 3D audio sample different from the first one may be presented at block 406 based on the recognized object being an object of a second type. E.g., a first chime may be presented for an intruding living thing or even an intruding person specifically, while a second, different chime may be presented for an intruding non-living thing such as a soccer ball passing through the interaction space. As another example, a generic dog bark may be presented for an intruding dog, while a generic cat "meow" may be presented for an intruding cat. The headset may thus keep the user apprised of the type of the intrusion/encroachment without fully breaking the user's immersion.

As for object size, the size of the encroaching object may be identified at block 404 using camera images along with computer vision, spatial mapping, etc. and even the relative size of other objects shown in the same image(s) for which locations are already known. A first 3D audio sample indicating the current location of the object within the interaction space may then be presented at block 406 based on the intruding object having a first size (or a particular size that falls within a first size range). Likewise, a second 3D audio sample different from the first one may be presented at block 406 based on the recognized object having a second size (or particular size that falls within a second, different size range).

For example, a first chime of a first volume level may be presented for an intruding object of a first size, while a second, different chime having a higher volume level than the first volume level may be presented for a different object of a larger size. The volume level of computer-generated voices and animal sounds may similarly vary according to the size of the person or animal. The headset may thus keep the user apprised of the size of the intrusion/encroachment without fully breaking the user's immersion since increased size might translate into increased risk of injury.

From block 406 the logic may in some examples proceed to block 408. To leave the user as immersed as possible within the simulation while still visually making the user aware of the encroachment, at block 408 the device may change the colors of the virtual presentation and/or other visual aspects of it based on the location of the encroachment itself. For example, if the encroachment is to the user's right, the right half of the user's FOV of the virtual simulation may be converted into and presented in red hues (e.g., similar to grayscale rendering) while other parts of the simulation may be presented in native colors. Likewise, if the encroachment is behind the user, the bottom half of the user's FOV of the simulation may be converted into and presented in red hues. From block 408 the logic may then proceed to block 410.

At block 410 the logic may also increase the volume level and/or frequency of presentation of the 3D audio responsive to identification of an increased risk of collision of the intrusion with the user as discussed herein (and/or increase the volume and frequency of the 3D audio as the user drifts farther and farther outside of the interaction space). In some examples, both volume level and frequency of presentation may be increased to heighten the user's awareness while leaving the user at least somewhat immersed. Thus, for instance, a predetermined 3D beep may be presented at a first volume level and first rate initially, and then as the associated intruding object gets closer to the user the volume level of the beep may be increased and the beep may be presented more frequently. Similarly, the volume level and frequency may decrease as the intruding object gets farther from the user (or as the user comes back within the interaction area from the direction of an encroached boundary). Also note that a pattern of the 3D audio may change based on increased or decreased collision risk, such as going from presenting one beep every half-second to presenting two beeps every half-second as the intrusion gets closer, and so on.

From block 410 the logic may then proceed to decision diamond 412. At diamond 412 the logic may in some examples determine whether the intrusion (or interaction space boundary) is within a threshold preset distance to the user. The threshold distance might be six inches, for example. Responsive to an affirmative determination at diamond 412, the device may move to block 414 to take additional action for safety reasons even if it breaks more of the user's immersion with the virtual simulation, such as stopping or pausing presentation of the simulation and/or presenting a notification such as the notification 300 described above. However, a negative determination at diamond 412 may instead cause the logic to revert back to block 406 and proceed therefrom.

Also note for completeness that if any point during the execution of the logic of FIG. 4 the device determines that the intrusion no longer exists or the user is sufficiently disposed within the designated interaction space, the device may stop presenting the 3D audio indicating the intrusion/encroachment location and simply go on presenting the simulation.

Further note with respect to the thresholds described herein that they may be established by a system administrator, simulation developer, and/or device manufacturer as appropriate. In some examples, the user may also be given the option to establish the thresholds, such as via a graphical user interface (GUI) similar to the one that will now be described.

Figure 5:
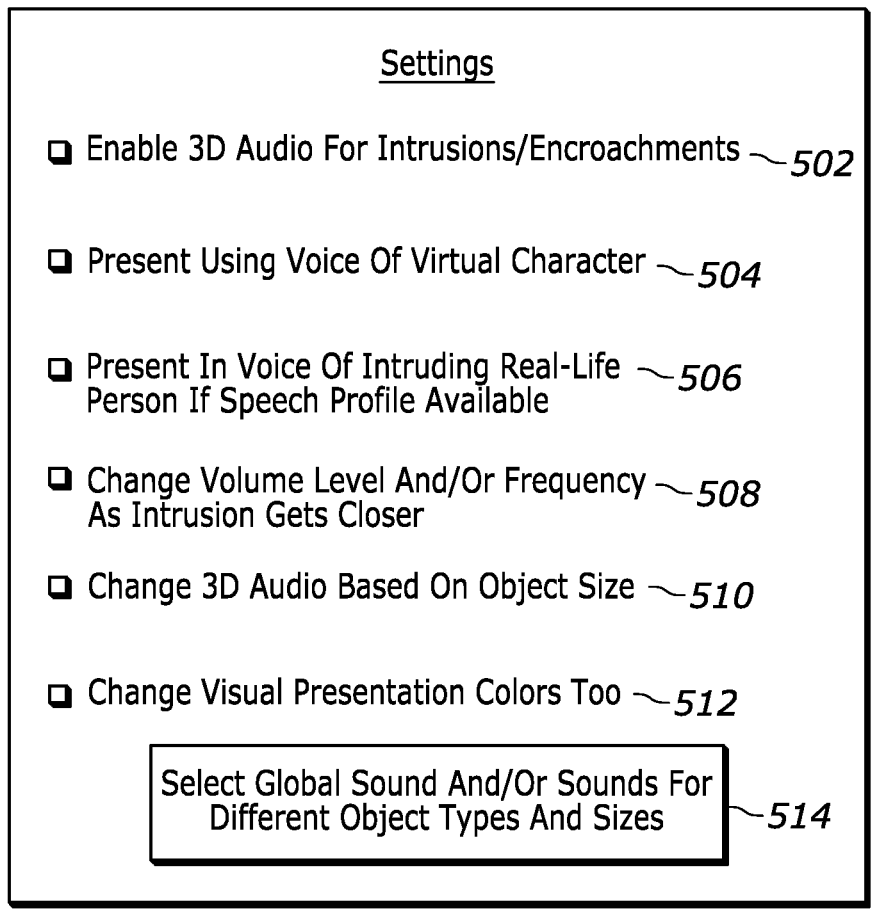
FIG. 5 shows an example graphical user interface (GUI) that may be presented to configure one or more settings of a system/device to operate consistent with present principles.

Accordingly, now describing FIG. 5, it shows an example GUI 500 that may be presented on the display of a headset or connected device to configure one or more settings of 3D audio presentation consistent with present principles. E.g., the GUI 500 may be presented during a setup process for the headset, during a setup process to define the interaction space, during a setup process for the virtual simulation itself, or at the user's choosing by navigating a settings menu for the headset or simulation. In the example shown, each option on the GUI 500 may be selected by directing touch or cursor input to the respective check box adjacent to the respective option.

As shown in FIG. 5, the GUI 500 may include a first option 502 that may be selectable a single time to set or enable the headset or other device to, for multiple future instances of virtual simulation presentation, execute the functions described above in reference to FIGS. 2 and 3 and to execute the logic of FIG. 4.

The GUI 500 may also include a second option 504 that may be selected to set or enable the device to present 3D audio in the voice of one or more virtual characters associated with a given simulation that is being presented when the associated encroachment is identified. An option 506 may be selected from the GUI 500 to set or enable the device to present 3D audio in the voice of an intruding real-life person as described above, assuming a speech profile/model for that person is available.

Still further, in some examples the GUI 500 may include an option 508 that may be selectable to set or enable the device to change the volume level and/or frequency at which 3D audio is presented as an intrusion gets closer to the user as described above. Option 510 may be selected from the GUI 500 to set or enable the device to change 3D audio presentation based on object size as also discussed above. Still further, in some examples the GUI 500 may include an option 512 that may be selected to set or enable the device to change the visual presentation's colors to indicate a direction in which the encroachment or intrusion is located relative to the user as also discussed above.

Additionally, in some examples the GUI 500 may include a selector 514. The selector 514 may be selected to launch another GUI that may be used by the user to upload a universal or global sound sample to use, and/or to select an existing sound sample to use for presentation as 3D audio consistent with present principles. Additionally, or alternatively, the other GUI may be used to upload or select different respective sound samples to use for different object types and/or sizes as described herein. Thus, the user may designate whatever sounds he or she might wish for production as 3D audio consistent with present principles.

Moving on from FIG. 5, further note consistent with present principles that in some examples a manufacturer of a headset or other device configured to operate as described herein may provide tool sets and/or application programming interfaces (APIs) to simulation developers, or embed them in the system's software, for the simulation developers to then customize 3D audio presentation themselves. The tools and APIs may even allow the developers to create specific audio profiles for a particular headset version to go with their simulation based on the audio parameters of headset itself. Thus, the developers can "pre-encode" what a desired audio output should be for that specific headset's hardware. The audio profile may then be uploaded to the headset or connected device for a custom experience with that headset.

While the particular embodiments are herein shown and described in detail, it is to be understood that the subject matter which is encompassed by the present invention is limited only by the claims.

What is claimed is:

1. A system comprising:
   at least one computer medium that is not a transitory signal and that comprises instructions executable by at least one processor to:
   identify an intrusion into an interaction space in the real world, the interaction space designated for use as part of a virtual reality (VR), augmented reality (AR), and/or mixed reality (MR) presentation;
   based on the identification of the intrusion, present three-dimensional (3D) audio indicating a current location of the intrusion within the interaction space, wherein the intrusion comprises a living being not making vocal sounds, and the 3D audio comprises a computer-generated vocal sound of the living being.

2. The system of claim 1, wherein the intrusion is identified using input from a camera.

3. The system of claim 1, wherein the intrusion is identified using light detection and ranging (LIDAR).

4. The system of claim 1, wherein the intrusion is identified using input from a microphone array and blind source separation.

5. The system of claim 4, comprising the microphone array.

6. The system of claim 1, wherein the 3D audio comprises a chime or tone.

7. The system of claim 1, wherein the 3D audio comprises a computer-generated voice.

8. The system of claim 7, wherein the intrusion comprises a person, and wherein the computer-generated voice models the person's own voice.

9. The system of claim 1, wherein the instructions are executable to:
   change a volume level at which the 3D audio is presented as the current location of the intrusion changes within the interaction space.

10. The system of claim 9, wherein the instructions are executable to:
    increase the volume level at which the 3D audio is presented as the intrusion gets closer to a current location of a user disposed within the interaction space, the user being different from the intrusion.

11. The system of claim 1, wherein the instructions are executable to:
change a frequency with which one or more chimes or tones of the 3D audio are presented as the current location of the intrusion changes within the interaction space.

12. The system of claim 11, wherein the instructions are executable to:
increase the frequency with which the one or more chimes or tones of the 3D audio are presented as the intrusion gets closer to a current location of a user disposed within the interaction space, the user being different from the intrusion.

13. The system of claim 1, comprising the at least one processor.

14. A method, comprising:
identifying an encroachment across a boundary of an interaction space existing in the real world, the interaction space designated for use as part of a virtual reality (VR), augmented reality (AR), and/or mixed reality (MR) presentation; and
based on the identifying of the intrusion, presenting three-dimensional (3D) audio indicating a current location of the intrusion within the interaction space, wherein the intrusion comprises a living being not making vocal sounds, and the 3D audio comprises a computer-generated vocal sound of the living being.

15. The method of claim 14, comprising:
identifying the encroachment at least in part by identifying an intrusion into the interaction space, the intrusion being different from a user disposed within the interaction space that is observing the presentation.

16. The method of claim 14, comprising:
identifying the encroachment at least in part by identifying a user disposed within the interaction space as at least partially crossing the boundary.

17. The method of claim 14, comprising:
increasing, as the encroachment gets closer to a current location of a user disposed within the interaction space, a volume level and/or frequency at which the 3D audio is presented, the user being different from the intrusion.

18. A system comprising:
at least one processor programmed with instructions to:
identify an encroachment of a physical object across a boundary of an interaction space existing in the real world, the interaction space designated for use as part of a virtual presentation; and
based on the identification of the encroachment, present three-dimensional (3D) audio indicating a current location of the encroachment within the interaction space, wherein the encroachment comprises a living being not making vocal sounds, and the 3D audio comprises a computer-generated vocal sound of the living being.

19. The system of claim 18, wherein the instructions are executable to:
identify a first object type associated with the encroachment;
based on identification the first object type, select the 3D audio for presentation, the 3D audio associated with the first object type but not a second object type different from the first object type; and
based on selection of the 3D audio for presentation, present the 3D audio.

20. The system of claim 18, wherein the 3D audio is first 3D audio, and wherein the instructions are executable to:
present the first 3D audio based on identifying the encroachment as having a first size; and
present second 3D audio based on identifying the encroachment as having a second size, the second size being larger than the first size, the second 3D audio being different from the first 3D audio.

\* \* \* \* \*